(12) United States Patent
Grant

(10) Patent No.: US 9,611,082 B2
(45) Date of Patent: Apr. 4, 2017

(54) SEAL RING FOR FOIL-SEALING A CONTAINER

(71) Applicant: Owens-Brockway Glass Container Inc., Perrysburg, OH (US)

(72) Inventor: Edward A. Grant, Toledo, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 85 days.

(21) Appl. No.: 13/892,775

(22) Filed: May 13, 2013

(65) Prior Publication Data

US 2014/0332536 A1 Nov. 13, 2014

(51) Int. Cl.
*B65D 53/02* (2006.01)
*B65D 77/20* (2006.01)
*F16J 15/02* (2006.01)

(52) U.S. Cl.
CPC ........... *B65D 53/02* (2013.01); *B65D 77/202* (2013.01); *F16J 15/02* (2013.01)

(58) Field of Classification Search
CPC ......... B65D 53/02; B65D 77/202; F16J 15/02
USPC ....... 220/217, 221, 223, 225, 226, 232, 233, 220/234, 295, 304, 795, 310.1, 849, 220/345.6, 803, 804, 806, 378; 215/341
See application file for complete search history.

(56) References Cited

U.S. PATENT DOCUMENTS

| | | | |
|---|---|---|---|
| 2,604,507 A * | 7/1952 | Tyson | H02G 3/088 174/367 |
| 3,874,580 A | 4/1975 | Weatherhead, III | |
| 4,087,018 A | 5/1978 | Tebbutt | |
| 4,114,668 A | 9/1978 | Hickey | |
| 4,378,892 A | 4/1983 | Ochs et al. | |
| 4,396,655 A | 8/1983 | Graham et al. | |
| 4,771,903 A | 9/1988 | Levene et al. | |
| 5,634,567 A * | 6/1997 | Hekal | 220/359.3 |
| 5,839,592 A | 11/1998 | Hayes | |
| 5,967,363 A * | 10/1999 | Allen | 220/806 |
| 6,401,957 B1 * | 6/2002 | Przytulla | B65D 43/0218 220/319 |
| 7,475,790 B2 * | 1/2009 | Hagano et al. | 220/304 |
| 7,823,736 B1 | 11/2010 | Pugne et al. | |
| 8,287,220 B2 | 10/2012 | Oberholzer et al. | |
| 8,579,150 B2 * | 11/2013 | Janny | 220/784 |

(Continued)

FOREIGN PATENT DOCUMENTS

| | | |
|---|---|---|
| EP | 1792844 | 6/2007 |
| EP | 2052984 A1 | 4/2009 |
| EP | 2377775 | 10/2011 |

OTHER PUBLICATIONS

PCT Search Report and Written Opinion, Int. Serial No. PCT/US2014/036617, Int. Filing Date: May 2, 2014, Applicant: Owens-Brockway Glass Container Inc., Mail Date: Sep. 23, 2014.

*Primary Examiner* — Robert J Hicks
*Assistant Examiner* — Kareen Thomas

(57) ABSTRACT

A seal ring for sealing a container. A seal ring has a base including a longitudinal axis extending therethrough and having a top surface, an undersurface opposite the top surface, and a projection extending from the undersurface in an axial direction. The projection is configured to be received by a complementary opening in the container. The seal ring may he part of a package that also includes a container having a mouth, an axially-facing sealing surface, and an opening in the sealing surface, and a foil sealingly and removably coupled to the base of the seal ring.

19 Claims, 2 Drawing Sheets

(56) References Cited

U.S. PATENT DOCUMENTS

| | | | |
|---|---|---|---|
| 8,792,249 B2 * | 7/2014 | Sasamori | H04M 1/0262 174/367 |
| 8,910,815 B2 * | 12/2014 | Mellander | B60K 15/03 220/234 |
| 2003/0160398 A1 | 8/2003 | Moidu | |
| 2005/0189351 A1 | 9/2005 | Clarke | |
| 2007/0272693 A1 | 11/2007 | Richards | |
| 2009/0032535 A1 | 2/2009 | Dunwoody et al. | |

* cited by examiner

US 9,611,082 B2

SEAL RING FOR FOIL-SEALING A CONTAINER

The present disclosure relates to seal rings and, more particularly, to seal rings for sealing containers, for example, glass containers.

BACKGROUND AND SUMMARY OF THE DISCLOSURE

Glass containers often include a base, a finish, and a body extending therebetween. The container finish, in turn, includes a sealing surface to which a removable foil may be secured in order to seal the container. Prior to securing the foil to the sealing surface, the sealing surface is conventionally prepared by, for example, applying a cold end coating thereto. The coating may be applied in a number of ways including by spray- or roller-coating.

A general object of the present disclosure is to provide a foil-sealed container that does not require that a cold end coating be applied to a sealing surface of the container finish to prepare the sealing surface for securing the foil thereto.

The present disclosure embodies a number of aspects that can be implemented separately from or in combination with each other.

A package, in accordance with one aspect of the present disclosure, includes a container including a longitudinal axis extending therethrough and having a mouth, an axially-facing sealing surface, and an opening in the sealing surface. The package further includes a seal ring having a base with a projection, wherein the projection is received in the sealing surface opening thereby securing the ring to the container. The package still further includes a foil sealingly and removably coupled to the ring.

In accordance with another aspect of the present disclosure, a seal ring for sealing a container includes a base including a longitudinal axis extending therethrough and having a top surface, an undersurface opposite the top surface, and a projection extending from the undersurface in an axial direction, wherein the projection is configured to be received by a complementary opening in the container.

In accordance with a further aspect of the present disclosure, a method of assembling a container and a seal ring includes heating a least a portion of the container to a predetermined temperature sufficient to cause at least a portion of the seal ring to melt When coupled to the container, and coupling the seal ring to the container when the container is at the predetermined temperature such that a portion of the seal ring melts and conforms to a sealing surface of the container. In an embodiment, the coupling step includes aligning a projection of the seal ring with an opening in the sealing surface of the container, and pressing the seal ring in an axial direction onto the container to press the projection into the opening in the sealing surface.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

Figure 1:
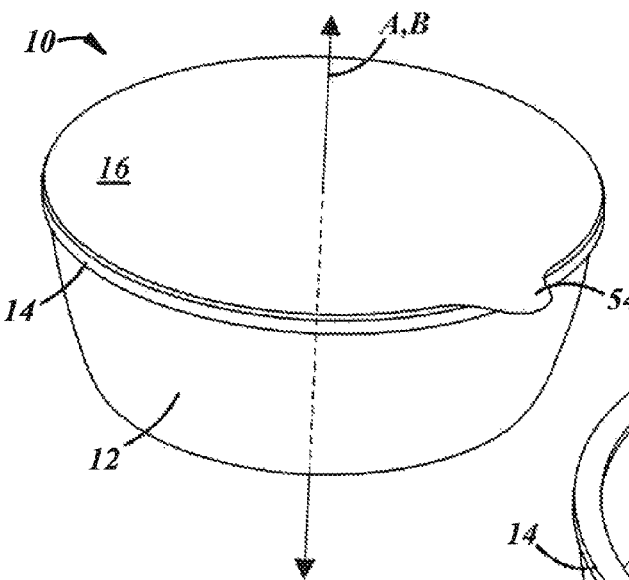
FIG. 1 is a perspective view of a package in accordance with an illustrative embodiment of the present disclosure, and including a container, a seal ring, and a foil sealingly and removably coupled to the seal ring.
Figure 2:
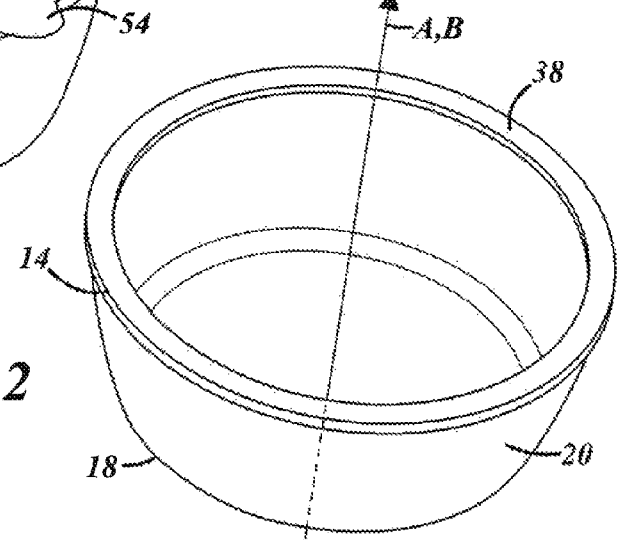
FIG. 2 is a perspective view of a container of the package of FIG. 1 having a seal ring assembled therewith.

FIG. 1 illustrates a package 10 including a container 12, a seal ring 14 coupled to or assembled with the container 12, and a foil 16 sealingly and removably coupled to the seal ring 14. As described in U.S. patent application Ser. No. 13/892,727, filed on May 13, 2013, assigned to the assignee hereof, and hereby incorporated herein by reference in its entirety, the seal ring 14 and the removable foil 16 are configured to close and seal the container 12 when the foil 16 is assembled with the seal ring 14, and the seal ring 14 is assembled with the container 12. The package 10 may be used to package any number of goods or products. For instance, the package 10 may be used to package food products, for example and without limitation, pickles, baby food, salsa, peppers, spaghetti sauces, and jams, to cite a few possibilities. The package 10 also may be used to package products other than food products, including, but not limited to, liquids, gels, powders, particles, and the like. Each of the container 12 and the seal ring 14 include or define a respective longitudinal axis (i.e., longitudinal axis A, in the case of container 12; and longitudinal axis B, in the case of seal ring 14) that are coincident with each other when the container 12 and the seal ring 14 are assembled together as illustrated in FIGS. 1 and 2.

Figure 3:
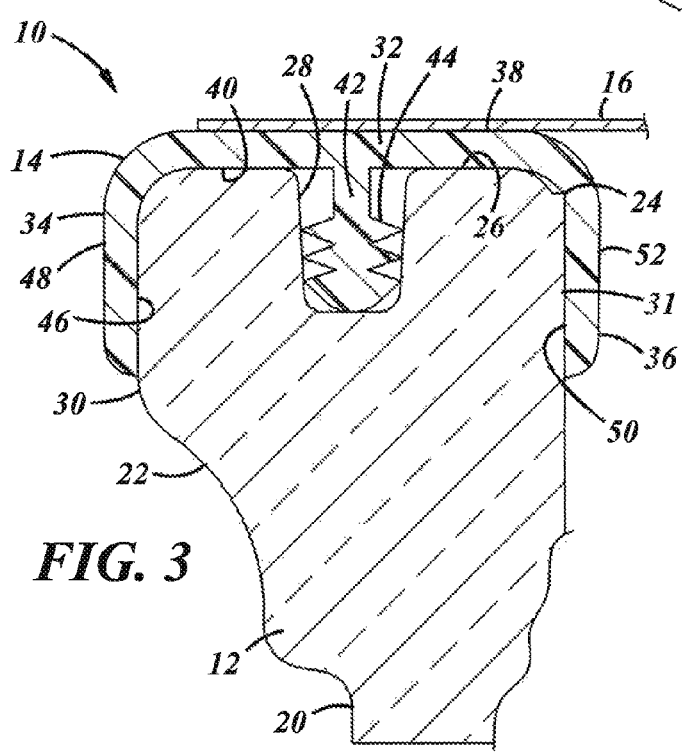
FIG. 3 is a fragmentary sectional view of one illustrative embodiment of the package of FIG. 1, illustrating the package in an assembled and sealed condition.

The container 12 may be composed of glass or any other material suitable for containing food products, and may comprise a bowl, a jar, or a cup, to cite a few possibilities. With reference to FIG. 2, the container 12 includes a base 18 and a body 20 extending from the base 18. In certain embodiments, the container 12 also may include a shoulder (not shown) extending from the body 20 and a neck (not shown) extending from the shoulder or directly from the body 20. In any event, and with reference to FIG. 3, the container 12 further comprises a finish 22 extending axially from the body 20 that includes an open mouth 24 surrounded by a sealing lip or surface 26. As illustrated in FIG. 3, the sealing surface 26 is an axially-facing surface that faces away from the container body 20, and has one or more openings 28 disposed therein. In one embodiment, the one or more openings 28 comprises a single, continuous annular channel; while in another embodiment, the one or more openings 28 may comprise a plurality of spaced apart channels, grooves, or pockets that together form a discontinuous annular channel or array. In any event, and as will be described in greater detail below, the opening(s) 28 is/are sized and shaped to receive and mate with one or more complementary projections 42 of the seal ring 14. For purposes of illustration, the description below will be with respect to an embodiment wherein the one or more openings 28 comprises a single, continuous annular channel in the sealing surface 26, though the present disclosure is not limited to such an arrangement.

In addition to the mouth 24 and the sealing surface 26, the container finish 22 further may include an external or radially outwardly extending engagement element 30 that surrounds the mouth 24 and that, in an embodiment, is configured to engage a portion of the seal ring 14 when the container 12 and seal ring 14 are assembled together. The engagement element 30 may comprise, for example and without limitation, a bead (e.g., crown bead), a flange, a lip, or other suitable feature. The engagement element 30 may extend completely circumferentially around the container finish 22; alternatively, it may comprise multiple discontinuous segments disposed about the circumference of the finish 22. The container finish 22 still further includes an inner, radially inwardly-facing surface 31 that, in an embodiment, is also configured to engage a portion of the seal ring 14 when the container 12 and the seal ring 14 are assembled together.

The seal ring 14 may be of an integral one-piece construction, or of a multiple-piece construction, and may be composed of metal, plastic, or any other material suitable for closing and sealing a container in the manner described herein. When seal ring 14 is assembled with the container 12, the ring 14 encircles the mouth 24 of the container 12. The seal ring 14 is annular with an inner diameter or opening or radially inner periphery, and an outer diameter or radially outer periphery. Additionally, in an embodiment, the seal ring 14 may be applied to the container 12 when the sealing surface 26 thereof has a tin oxide coating but not a cold end coating that is conventionally required for the foil-sealing of glass containers. In the embodiment illustrated in FIG. 3, the seal ring 14 includes a base 32, a radially outer portion 34, and an inner seal 36.

The base 32 includes a first or top surface 38, and a second or undersurface 40 opposite the top surface 38. The top surface 38 is an axially-facing surface and comprises a sealing surface to which, as will be described below, the foil 16 may be coupled. The undersurface 40 is also an axially-facing surface, however, it faces in an axial direction that is opposite that in which the top surface 38 faces (i.e., the top surface 38 and the undersurface 40 face in opposite directions). The longitudinal axis B of the seal ring 14 extends perpendicular to a plane extending along one of the base surfaces 38, 40, and centrally with respect to the outer radial periphery of the seal ring 14.

In addition to the top surface 38 and the undersurface 40, the base 32 further includes one or more projections 42 extending in an axial direction from the undersurface 40. As used herein, the term "axial" includes oriented generally along an axis but is not limited to a direction strictly parallel to the axis, In one embodiment, the one or more projections 42 comprises a single, continuous annular projection; while in another embodiment, the one or more projections 42 may comprise a plurality of spaced apart projections that together form, for example, a discontinuous annular projection or an array. In any event, the projection(s) 42 is/are configured to be received within and mated with complementary opening (s) 28 in the container finish sealing surface 26. For purposes of illustration, the description below will be with respect to an embodiment wherein the one or more projections 42 comprises a single, continuous annular projection that is configured for mating with the annular channel in the container finish sealing surface 26, though the present disclosure is not limited to such an arrangement.

As shown in the embodiment illustrated in FIG. 3, the projection 42 includes one or more barbs or protrusions 44 extending radially therefrom. As used herein, the term "radial" includes oriented generally perpendicular to an axis but is not limited to a direction that is strictly perpendicular to the axis. The barb(s) 44 are configured to engage the inner surface of the channel when the projection 42 is disposed within the opening 28 (i.e., when the seal ring 14 is assembled with the container 12) and act to retain the projection 42 therein. In any event, the mating of the projection 42 and the opening 28 serves to secure the seal ring 14 to the container 12. In addition to the mechanical fit created by the mating of the projection 42 and opening 28 securing the seal ring 14 to the container 12, in an embodiment, an adhesive, for example, and without limitation, plastisol or any other FDA or foodstuff approved material or sealing adhesive material, may also be utilized. This adhesive may be applied to one or both of the container finish sealing surface 26 (which may, but does not necessarily have to, include the inner surfaces of the opening 28), and/or the undersurface 40 of the seal ring 14. In an embodiment, the coupling or assembly of the seal ring 14 with the container 12 renders the seal ring 14 substantially non-removable from the container 12, meaning that, by design intent, the seal ring 14 is not intended to be removed from the container 12 without destroying or at least damaging the container 12 and/or the seal ring 14.

The radially outer portion 34 of the seal ring 14 extends away from the base 32 in an axial direction (i.e., in an axial downward direction) such that it is generally perpendicular to the base 32. The outer portion 34 includes an inner surface 46 and an outer surface 48. The inner surface 46 is configured to engage an outer surface of the container finish 22 when the seal ring 14 is assembled with the container 12. In an embodiment, the radially outer portion 34 may be elastically deformable so as to allow for the coupling of seal ring 14 to the container 12 (i.e., the outer portion 34 may be configured to deflect in the manner described below). In another embodiment, the radially outer portion 34 may take the form of the radially outer portion described in U.S. patent application Ser. No. 13/892,727, the entire contents of which were incorporated herein by reference above, and as such, may "snap" over the engagement element 30 of the container finish 22. In any case, the radially outer portion 34 may be disposed at the radially outermost point of the base 32, though the present disclosure is not limited to such an arrangement.

The inner seal 36 of the seal ring 14 is operative to provide, at least in part, a seal between the seal ring 14 and the container 12. The seal 36 may comprise any number of seals, for example, a plug seal, a valve seal, or any other suitable seal. For purposes of illustration, the description below will be with respect to an embodiment wherein the inner seal 36 comprises a valve seal (i.e., "inner valve seal 36"), though the present disclosure is not limited to such an embodiment. One benefit of a valve seal, among potentially others, is that it is configured such that the seal created thereby is improved with the application of a vacuum to the interior of the container 12 (e.g., as the pressure inside the container 12 decreases, the seal formed between the inner valve seal 36 and the container 12 is tightened).

As with the outer portion 34 described above, in an embodiment, the inner valve seal 36 includes an inner surface 50 and an outer surface 52. The inner surface 50 is configured to engage the mouth 24 of the container finish 22 when the seal ring 14 is assembled with the container 12. More specifically, in an embodiment, the inner valve seal 36 may be elastically deformable such that it may be biased into a sealing engagement with the mouth 24 or the inner finish surface 31 of the container 12, thereby forming a liquid and/or air tight seal between the seal ring 14 and the container 12 (i.e., the valve seal 36 may be configured to deflect in the manner described below). In another embodiment, the inner valve seal 36 may take the form of the inner seal described in U.S. patent application Ser. No. 13/892, 727, the entire contents of which were incorporated herein by reference above. In any instance, the inner valve seal 36 may extends from a radially innermost point of the base 32, though the present disclosure is not limited to such an arrangement.

As briefly described above, the package 10 further includes the foil 16 that is sealingly and removably coupled to the seal ring 14 and that serves to seal the container 12 when the seal ring 14 and container 12 are assembled together. The foil 16 may be composed of any number of materials suitable for hermetically sealing the container 12, including, for example and without limitation, a metallic material (e.g., aluminum), a polymeric or plastic material (e.g., polyethylene terephthalate (PET), a paper material (e.g., wax paper), or other material or substrate suitable to form a seal. In the embodiment illustrated in FIG. 3, the foil 16 is removably and sealingly coupled to the base 32 of the seal ring 14, and more particularly, to the top surface 38 of the base 32, which thereby serves as a sealing surface of both the seal ring 14 and the package 10 when the seal ring 14 is assembled with the container 12. The foil 16 and the material of the seal ring 14 are closely matched to achieve optimal performance, and the foil 16 may be coupled to the base 32 of the seal ring 14 using any number of techniques, including, for example, induction and conduction sealing techniques, and/or any other suitable technique known in the art. The foil 16 may be coupled to the seal ring 14 prior to assembling or coupling the seal ring 14 with the container 12, or alternatively, thereafter. As illustrated in FIG. 1, foil 16 may include a tab 54 extending from the periphery thereof that is configured to allow a user to remove the foil 16 from the seal ring 14 by pulling the tab 54 away from the seal ring 14 and the container 12.

Figure 4:
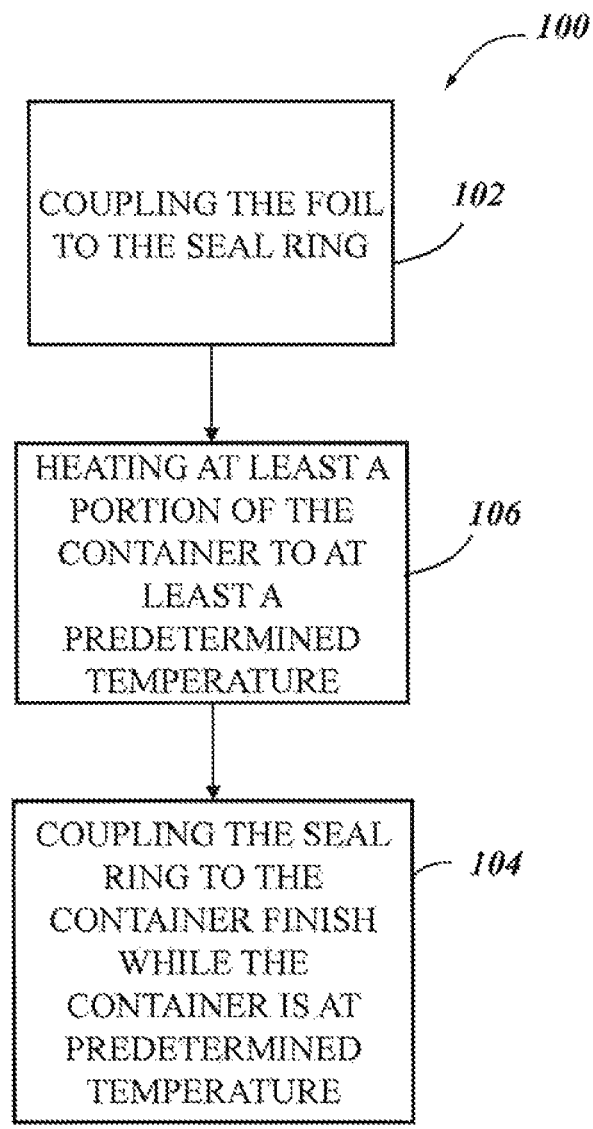
FIG. 4 is a flow chart depicting an illustrative embodiment of a method of assembling a container and a seal ring.

With reference to FIGS. 3 and 4, an illustrative method of assembling the package 10 will now be described.

In a step 102, the foil 16 is coupled to the base 32 of the seal ring 14. In one embodiment, step 102 is performed prior to the seal ring 14 being coupled to or assembled with the container 12, while in another embodiment step 102 is performed after the seal ring 14 and the container 12 are assembled together.

In any event, in a step 104, the seal ring 14 is aligned with the mouth 24 and the sealing surface 26 of the container finish 22, and is then pressed in an axial direction onto the container finish 22. More particularly, in step 104, the projection 42 of the seal ring 14 is aligned with the opening 28 in the container sealing surface 26. Once properly aligned, the seal ring 14 is pressed in an axial direction onto the container finish 22, and the projection 42 is pressed into the opening 28. As the projection is pressed into the opening, the barbs 44 of the projection 42 engage the inner surface of the opening 28, thereby creating a mechanical fit between the seal ring 14 and the container 12 and securing the seal ring 14 to the container 12. In an embodiment, as the seal ring 14 is pressed onto the container 12 and the inner valve seal 36 contacts the mouth 24 of the container finish 22, the inner valve seal 36 deflects in a radially inward direction into sealing engagement with the mouth 24 and/or the inner surface 31 of the container finish 22. The valve seal 36 remains biased against the mouth 24 or inner finish surface 31 to create a seal between the seal ring 14 and the container 12. Additionally, in an embodiment, as the seal ring 14 is pressed onto the container 12 and the radially outer portion 34 of the seal ring 14 contacts the container sealing surface 26, the outer portion 34 deflects in a radially outward direction into engagement with an outer surface of the container 12, and more particularly, an outer surface of the container finish 22. In an embodiment, step 104 is performed when the material of the container 12 is at a temperature sufficient to cause at least a portion of the base 32 of the seal ring 14 to melt and more completely conform to the sealing surface 26 of the container finish 22 to form a more complete seal between the seal ring 14 and the container 12 (e.g., the seal ring 14 will conform to imperfections in the sealing surface 26, for example).

Accordingly, in an embodiment, the method 100 further may comprise a step 106 of heating the container 12, or at least a portion thereof that includes the container finish 22, to a predetermined temperature sufficient to cause a desired amount of melting of the seal ring 14 prior to performing step 104. In an embodiment, step 106 may be performed during, or comprise a part of, the container manufacturing process where the residual heat from that process is sufficient to cause at least a portion of the seal ring 14 to melt. In another embodiment, step 106 may he independent of the container manufacturing process and may comprise applying heat to the container 12, or at least a portion thereof, immediately prior to performing step 104 of the method 100. In either case, the particular temperature required to sufficiently and acceptably melt the seal ring 14 is dependent upon the particular materials of which the seal ring 14 and/or the container 12 is/are formed, and may be empirically derived by testing different materials and combinations of materials to achieve the desired amount of seal ring melting.

There thus has been disclosed a package that fully satisfies one or more of the objects and aims previously set forth. The disclosure has been presented in conjunction with an illustrative embodiment, and modifications and variations have been discussed. Other modifications and variations readily will suggest themselves to persons of ordinary skill in the art in view of the foregoing discussion. The disclosure is intended to embrace all such modifications and variations as fall within the spirit and broad scope of tile appended claims.

The invention claimed is:

1. A package that includes:
   a container including a longitudinal axis extending therethrough and having a mouth, an axially-facing sealing surface, and an opening in said sealing surface;
   a seal ring having a base with a projection, wherein said projection includes one or more barbs extending radially therefrom and is received in said sealing surface opening thereby securing said seal ring to said container; and
   a foil sealingly and removably coupled to said ring.

2. The package set forth in claim 1, wherein said opening comprises an annular channel in said sealing surface, and said projection comprises an annular projection received in said annular channel.

3. The package set forth in claim 1, wherein said base of said seal ring has a top surface and an undersurface opposite said top surface, and further wherein said foil is coupled to said top surface, and said projection extends from said undersurface in an axial direction.

4. The package set forth in claim 1, wherein said seal ring further includes an inner seal biased into sealing engagement with said mouth of said container.

5. The package set forth in claim 1, wherein said seal ring further includes a radially outer portion, and further wherein an inner surface thereof is in engagement with an outer surface of said container.

6. The package set forth in claim 1, wherein said container is formed of glass.

7. The package set forth in claim 1, wherein said seal ring is formed of plastic.

8. The package set forth in claim 1, wherein said seal ring is adhesively affixed to said sealing surface of said container.

9. The package set forth in claim 1, wherein said opening comprises a channel in said sealing surface extending in an axial direction toward said base of said container relative to the longitudinal axis of said container.

10. A seal ring for sealing a container, and including:
a base including a longitudinal axis extending therethrough and having:
a top surface;
an undersurface opposite said top surface; and
a projection extending from said undersurface in an axial direction, wherein said projection includes one or more barbs extending outwardly therefrom, and further wherein said projection is configured to be received by a complementary opening in the container.

11. The seal ring set forth in claim 10, further comprising a foil removably coupled to said base.

12. The seal ring set forth in claim 11, wherein said foil is coupled to said top surface of said base.

13. The seal ring set forth in claim 10, wherein said projection comprises an annular projection.

14. The seal ring set forth in claim 10, further comprising an inner seal configured to be biased into sealing engagement with a mouth of the container.

15. The seal ring set forth in claim 10, wherein said base is formed of plastic.

16. The seal ring set forth in claim 14, wherein the inner seal comprises a valve seal.

17. A seal ring for sealing a container, including:
a radially outer portion having an inner surface configured to engage an outer surface of the container; and
a base including a longitudinal axis extending therethrough and having:
a top surface;
an undersurface opposite said top surface; and
a projection located radially-inwardly of said radially outer portion and extending from said undersurface of said base in an axial direction, said projection configured to be received by a complementary opening in the container; and
an inner seal configured to be biased into sealing engagement with a mouth of the container, wherein the inner seal comprises a valve seal.

18. The seal ring set forth in claim 17, further comprising a foil removably coupled to said base.

19. The seal ring set forth in claim 18, wherein said foil is coupled to said top surface of said base.

* * * * *